United States Patent
Ives, Jr. et al.

(10) Patent No.: US 6,753,034 B2
(45) Date of Patent: Jun. 22, 2004

(54) METHOD OF METALLIZATION OF AN OPTICAL WAVEGUIDE

(75) Inventors: Milton E. Ives, Jr., North Windham, CT (US); Thomas W. Engel, East Hampton, CT (US)

(73) Assignee: CiDRA Corporation, Wallingford, CT (US)

( * ) Notice: Subject to any disclaimer, the term of this patent is extended or adjusted under 35 U.S.C. 154(b) by 0 days.

(21) Appl. No.: 10/178,939

(22) Filed: Jun. 20, 2002

(65) Prior Publication Data

US 2003/0026916 A1 Feb. 6, 2003

Related U.S. Application Data

(60) Provisional application No. 60/304,866, filed on Jul. 12, 2001.

(51) Int. Cl.[7] .............................. B05D 5/06; B05D 3/10; B05D 1/18
(52) U.S. Cl. .................... 427/163.2; 427/162; 427/304; 427/305; 427/443.1
(58) Field of Search .............................. 427/162, 163.2, 427/304, 305, 437, 438, 443.1

(56) References Cited

U.S. PATENT DOCUMENTS

| | | |
|---|---|---|
| 4,368,221 A | 1/1983 | Stefan et al. |
| 4,915,467 A | 4/1990 | Berkey |
| 5,380,559 A * | 1/1995 | Filas et al. .................. 427/305 |
| 5,745,626 A | 4/1998 | Duck et al. |
| 5,774,615 A | 6/1998 | Uda et al. |
| 5,892,618 A | 4/1999 | Filas |
| 6,251,252 B1 | 6/2001 | Chen |
| 6,355,301 B1 * | 3/2002 | Miller ....................... 427/163.2 |
| 6,524,642 B1 * | 2/2003 | Leibman et al. ................ 427/8 |

FOREIGN PATENT DOCUMENTS

| | | |
|---|---|---|
| DE | 197 18 971 A | 11/1998 |
| EP | 0 623 565 | 11/1994 |

OTHER PUBLICATIONS

Patent Abstract of Japan, Baba Keizou, Optical Fiber For Connecting Terminal, Patent No. 60090308, Published May 21, 1985.

* cited by examiner

*Primary Examiner*—Michael Barr
(74) *Attorney, Agent, or Firm*—Ware, Fressola, Van Der Sluys & Adolphson LLP

(57) ABSTRACT

A method of applying a metal coating to optical element, such as an optical waveguide, comprising the steps of partially depleting stabilizers in an electroless metallic solution and immersing an optical waveguide in the electroless metallic solution to deposit the metal coating to the optical waveguide. The step of partially depleting may include creating an electroless metallic solution having a sodium hypophoshite concentration of about 25 grams per liter. The electroless metallic solution may comprise a Fidelity solution 4865A, a Fidelity solution 4865B and de-ionized water in a ratio of 1:1:18; and sodium hypophosphite crystals. Alternatively, the step of partially depleting may include placing a dummy load into the electroless metallic solution. The dummy load may be a rectangular block of metal, formed of a low carbon steel, and may have a threaded cylindrical passage therein. After depleting the stabilizers, the optical waveguide is immersed in the electroless metallic solution for a predetermined length of time depending on a desired deposition thickness.

11 Claims, 3 Drawing Sheets

THE OVERALL PROCESS

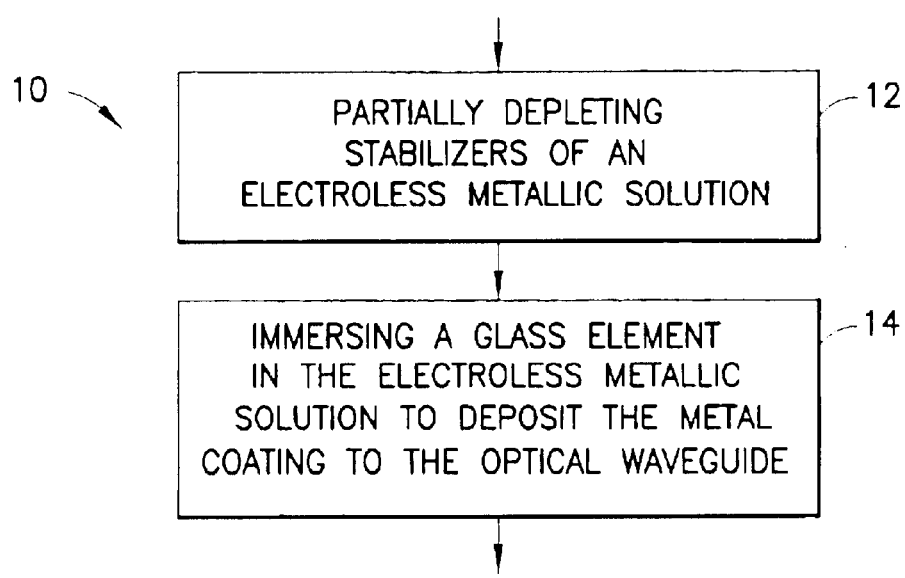
FIG.1 METHOD OF APPLYING METAL COATING TO OPTICAL WAVEGUIDE
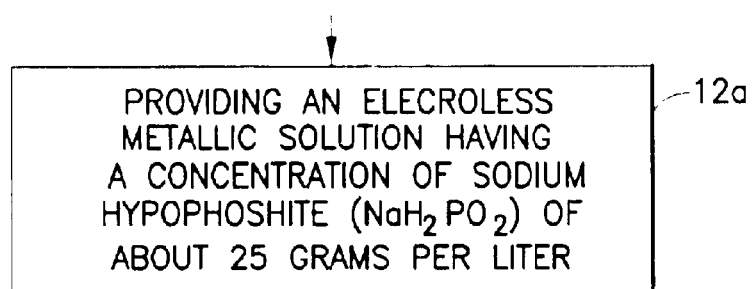
FIG.2 ONE PARTIAL DEPLETION STEP
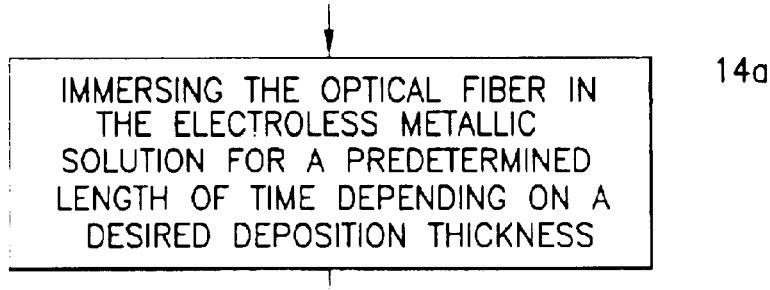
FIG.3 IMMERSION STEP

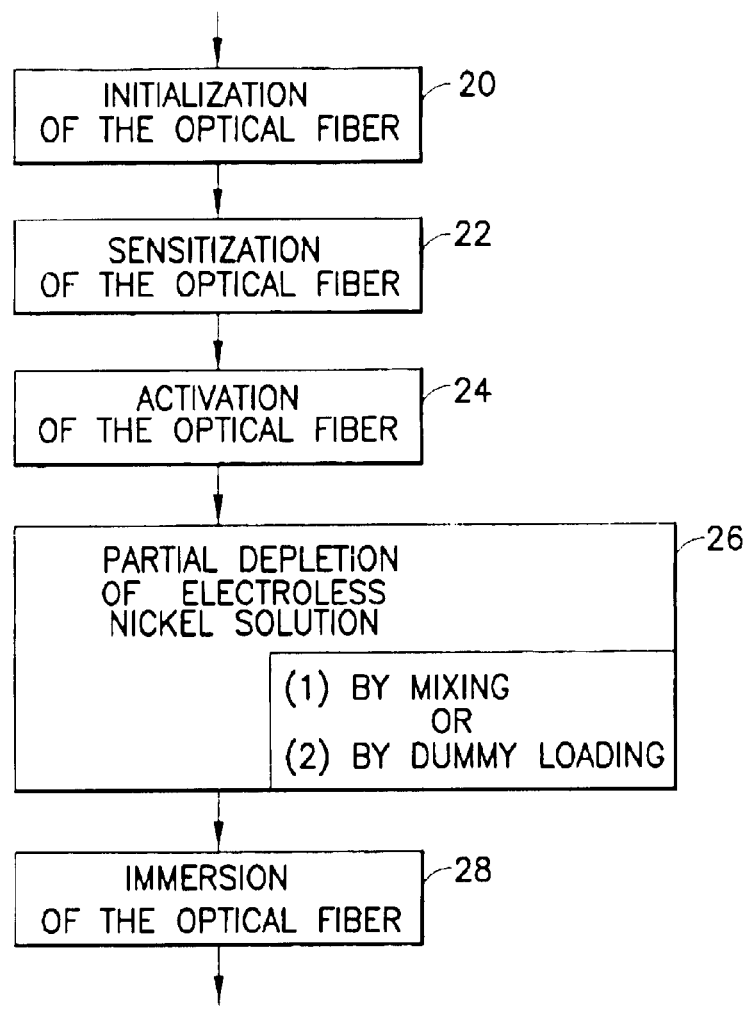
FIG.4 THE OVERALL PROCESS
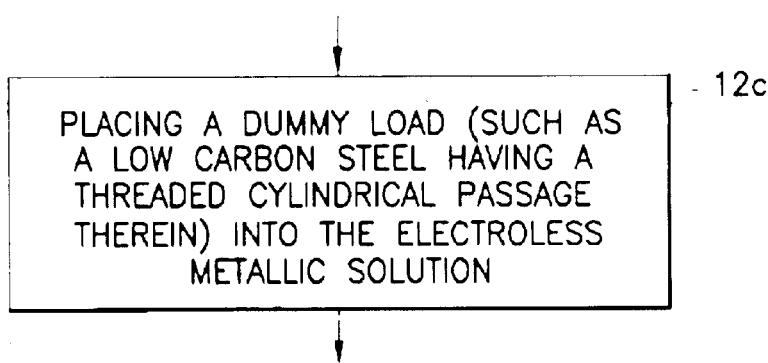
FIG.5(A) ANOTHER PARTIAL DEPLETION STEP

METHOD OF METALLIZATION OF AN OPTICAL WAVEGUIDE

This application claims the benefit of U.S. Provisional Application No.: 60/304,866 filed Jul. 12, 2001.

BACKGROUND OF INVENTION

1. Technical Field

The present invention relates to a method for metallization of a glass element, including an optical waveguide such as an optical fiber, a large diameter waveguide cane structure or planar waveguide.

2. Description of Related Art

There are known methods for metallization of optical fibers and large glass structures. These methods include vapor deposition methods, wet chemical processes, and additional methods that utilize a combination of the two approaches. The inherent problems with vapor deposition methods are heat-induced damage to the fiber substrate, poor adhesion of the metal coating, and non-uniformity of the coating. Wet chemical processes are currently the most attractive metallization methods for the highest coating adhesion and quality.

Standard wet chemical processes for the metallization of large glass substrates have been tried to metallize optical fiber. These known wet chemical processes utilize tin chloride ($SnCl_2$) for surface sensitization and palladium chloride ($PdCl_2$) for activation, respectively, prior to metallization by electroless nickel deposition. Common problems with using these known wet chemical processes to metallize optical components lie in the occurrence of inconsistent results and the production of incomplete coatings.

Another approach for the metallization of an optical fiber disclosed by Filas et al. (U.S. Pat. No. 5,380,559) uses tin fluoride ($SnF_2$) in place of tin chloride for sensitization. The primary difficulties of this approach are caused by the unstable nature of tin fluoride. Subsequently, preparation of the tin fluoride solution, sensitization, and activation must be carried out in a non-oxygen inert atmosphere (such as nitrogen or argon) in order to prevent oxidation of the sensitized fiber and tin fluoride solution.

Further, it is known to complete the metallization of an optical fiber using an electroless metallic solution consisting of the Fidelity solution 4865A (constituent part which is nickel sulfate), the Fidelity solution 4865B (constituent parts which are sodium hypophosphite, sodium hydroxide and acetic acid) and de-ionized water in a ratio of 1:3:16. However, this known electroless metallic solution is not active enough with such small surface areas and did not plate when using tin chloride ($SnCl_2$). This standard mix resulted in the electroless metallic solution having a sodium hypophosphite concentration of 30 g/L. This standard mix contained too many stabilizers, which were preventing the plating from initializing on the fiber.

In view of this, it was found that, when plating optical fibers in the known electroless nickel solution, the plating rates and platability of the optical fibers were inconsistent and unacceptable.

The reasons for this include the fact that:

1) The optical fiber has a small surface area, i.e. a small load, in relation to known stabilizers. The electroless nickel solution is autocatalytic. The larger the area to be plated, the easier it is for the reaction to start and maintain itself. An optical waveguide, such as an optical fiber, is not a "load" that lends itself to an easy start.

2) The commercially available electroless nickel solutions, such as the aforementioned Fidelity solutions, contain too many stabilizers. These chemicals were originally intended to prevent the bath from "plating out" (which is feeding off of itself at an uncontrolled rate until all the nickel is gone), and to prevent plating on the sides of its container. These stabilizers interfere with the plating on the optical fiber.

In view of the aforementioned, there is a need in the industry for a better way to metallize an optical waveguide using a wet chemical process.

SUMMARY OF INVENTION

In its broadest sense, the present invention provides a method of applying a metal coating to a glass element having a small surface area comprising a unique set of steps. The glass element may include an optical waveguide such as an optical fiber typically having a diameter of 125 microns, a large diameter waveguide cane structure having a diameter of at least 0.3 millimeters or greater, or a planar waveguide.

First, the stabilizers of an electroless metallic solution are partially depleted therein. One way of partially depleting the stabilizers is to provide an electroless metallic solution having a concentration of sodium hypophoshite of about 25 grams/liter.

The electroless metallic solution may comprise a first solution having nickel sulfate (such as the Fidelity solution 4865A), a second solution having sodium hypophosphite, sodium hydroxide and acetic acid (such as the Fidelity solution 4865B) and de-ionized water in a ratio of about 1:1:18; and sodium hypophosphite crystals, which are added to create a sodium hypophoshite concentration of about 25 grams per liter in the electroless metallic solution. In effect, the volume of the Fidelity solution 4865B is reduced and the de-ionized water is increased of the known electroless metallic solution (i.e., 1:3:16 solution), as described hereinbefore, to achieve the desired partial depletion of the stabilizers in the electroless metallic solution.

Alternatively, another way of partially depleting the stabilizers is to place a dummy load into an electroless metallic solution. The dummy load may be a rectangular block of metal, which may be formed of a low carbon steel and may include a threaded cylindrical passage therein.

The electroless metallic solution used with the dummy load may comprise a first solution having nickel sulfate (such as the Fidelity solution 4865A), a second solution having sodium hypophoshite, sodium hydroxide and acetic acid (such as the Fidelity solution 4865B) and de-ionized water in a ratio of about 1:3:16.

After partially depleting the stabilizer of the electroless metallic solution, the glass element is immersed in the electroless metallic solution to deposit a metal coating, for example, to the glass element, for a predetermined length of time depending on a desired deposition thickness. The nickel coating may also be further coated with gold to form a gold on nickel coating. The gold coating prevents the nickel coating from oxidizing.

The method also includes other steps such as initialization, sensitization and activation of the optical waveguide.

One advantage of the method of the present invention is that it can be executed in a tabletop environment with no need for an inert atmosphere.

The foregoing and other objects, features and advantages of the present invention will become more apparent in light

BRIEF DESCRIPTION OF THE DRAWING

The drawing includes FIGS. 1–6, and the following is a brief description thereof:

FIG. 1 is a flowchart showing the two basic steps of the method that is the subject matter of the present invention.

FIG. 2 shows one embodiment of the partial depletion step shown in FIG. 1.

FIG. 3 shows one embodiment of the immersion step shown in FIG. 1.

FIG. 4 is a flowchart showing the overall process of the method that is the subject matter of the present invention.

FIG. 5(A) shows another embodiment of the partial depletion step shown in FIG. 1.

DETAILED DESCRIPTION OF THE INVENTION

FIG. 1: The Basic Invention

Figure 5B:
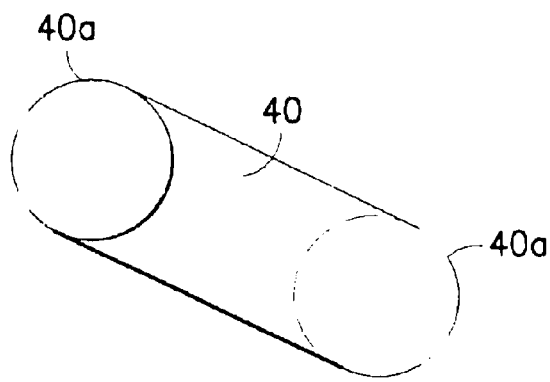
FIG. 5(B) shows a cylindrical dummy load for use in the method shown in FIGS. 1, 5(A) and 4.

FIG. 1 shows a flowchart of steps of a method, generally indicated as 10, of applying a metal coating to a glass element. The method 10 includes a step 12 of partially depleting stabilizers of an electroless metallic solution, as well as a step 14 of immersing the glass element such as an optical waveguide in the electroless metallic solution to deposit the metal coating to the optical waveguide. The aforementioned two steps provide a unique combination of steps of applying a metal coating to the optical waveguide in a non-inert environment or atmospheric environment.

The overall method of applying the coating to the optical waveguide also includes other steps such as initialization, sensitization and activation of the optical fiber which are discussed in more detail below in relation to FIG. 4.

The scope of the invention is not intended to be limited to the type of glass element, as described above, or the manner in which the glass element is used after the metal coating is applied thereto.

FIG. 2

FIG. 2 shows one embodiment of the method, wherein the step 12 of partially depleting includes a step 12a of providing an electroless metallic solution having a concentration of sodium hypophoshite ($NaH_2PO_2$) of about 25 grams per liter.

The step 12a includes adding sodium hypophosphite crystals to an initial electroless metallic solution to create the electroless metallic solution having a sodium hypophosphite concentration ($NaH_2PO_2$) of about 25 grams per liter. For example, the initial electroless metallic comprises a Fidelity solution 4865A (constituent part which is nickel sulfate), a Fidelity solution 4865B (constituent parts which are sodium hypophosphite, sodium hydroxide and acetic acid) and de-ionized water in a ratio of 1:1:18. However, the ratio of 1:1:18 was found to reduce the sodium hypophosphite concentration to 10 g/L. (The 4865 Part B component is the sodium hypophosphite carrier as well as the inhibitor carrier). The addition of enough of crystal sodium hypophosphite to reach the original 30 g/L concentration resulted in a solution that was too active, produced poor quality plating, including poor coating adhesion and increased coating brittleness. Experimentation showed that the sodium hypophosphite concentration ($NaH_2PO_2$) of about 25 grams per liter produced the desired plating results.

FIG. 3

In FIG. 3, the immersing step 14 includes a step 14a of immersing the glass element such an optical fiber in the electroless metallic solution for a predetermined length of time depending on a desired deposition thickness. The desired deposition thickness is about 2–3 microns, and the desired plating rate is about 0.22 microns/minute. The metal coating may be, for example, gold on nickel. One such electroless gold solution is supplied by a company Technic, Inc., named Oromerse.

FIG. 4: Steps of the Overall Method

FIG. 4 shows a flowchart of the basic steps of the overall method of applying a metal coating to an optical waveguide.

Initialization Step 20

First, an optical fiber having a polymer jacket is initially prepared by cleaning the polymer jacket with acetone, followed by isopropanol using lint-free wipes. The polymer jacket is then removed from the optical fiber by immersing the area to be plated in a stirred 90% sulfuric acid at a temperature of about 160–180° C. The area to be plated is then rinsed in 18M ohms de-ionized water (DI).

Sensitization Step 22

Second, the optical fiber is immersed in a gently stirred sensitization solution for about 2–3 minutes at room temperature. The sensitization solution is prepared by mixing a sensitizer having the constituent part of tin chloride ($SnCl^2$) together with de-ionized water (DI) in a ratio of about 13:1 for about 10 minutes. One such known sensitizer is Shipley Sensitizer 471. The scope of the invention is intended to include using other sensitizers having suitable constituent parts. While it is known in the art to add hydrochloric acid (Hcl) to the electroless metallic solution, it was found to be not only unnecessary for this application, but also detrimental to the process at certain concentrations. Upon removal of the optical fiber from the sensitizer solution, it is rinsed at least once in 18M Ohm de-ionized water (DI).

Activation Step 24

Third, the optical fiber is then immersed in a gently stirred activation solution for about 1 minute. The activation solution is prepared by mixing an activator solution having the constituent parts of palladium chloride ($PdCl^2$) and hydrogen chloride (Hcl) together with a de-ionized water (DI) at a ratio of about 1:1:50, respectively, for about 10 minutes. One such known activator solution is Shipley Activator 472. The scope of the invention is intended to include using other activators having suitable constituent parts. Upon removal from the activator solution, the optical fiber is rinsed at least once in the de-ionized water (DI).

Partial Depletion Step 26

Fourth, the partial depletion step 26 may be accomplished using the two techniques described hereinbefore for steps 12 of FIG. 1. Both of these techniques have the effect of depleting the stabilizers in the electroless solution, thus making it more active, making the reaction initiation threshold more suitable for low surface area metallization, as well as bringing the reaction maintenance rate into a range that is suitable.

In the stabilizer concentration lowering technique as described in step 12a of FIG. 2, the electroless nickel solution EN is prepared using known solutions, such as the Fidelity solution 4865A (having a constituent part of nickel sulfate) and the Fidelity solution 4865B (having constituent parts of sodium hypophosphite, sodium hydroxide and acetic acid) together with a de-ionized water (DI), mixed in a ratio of 1:1:18, respectively, to reduce the stabilizer (deposition inhibitor) level in the solution. As an addition to this formulation, sodium hypophosphite ($NaH_2PO_2$) crystals are added in order to obtain a concentration of about 25 grams per liter. By adjusting the concentration of $NaH_2PO_2$ to about 25 g/L (instead of the typical 30 g/L), the electroless nickel solution EN is less active, resulting in improved adhesion and ductility of the nickel coating to the optical fiber.

In the dummy loading technique as described in step 12 of FIG. 1, an electroless metallic solution may be partially depleted of stabilizers and the Ph increased in the solution by the dummy loading technique. The electroless metallic solution used with the dummy load may comprise a first solution having nickel sulfate (such as the Fidelity solution 4865A), a second solution having sodium hypophoshite, sodium hydroxide and acetic acid (such as the Fidelity solution 4865B) and de-ionized water in a ratio of about 1:3:16.

FIG. 5A shows an embodiment of the method, wherein the step 12 of partially depleting in FIG. 1 includes a step 12c of placing a dummy load into the electroless metallic solution. Preferably, the dummy load is a rectangular block of metal made of a low carbon steel having a threaded cylindrical passage therein, as shown and described below.

In operation, once the electroless metallic solution (e.g. nickel solution) obtains a temperature (about 85° C.), a cleaned piece of low carbon steel (i.e., dummy load) is placed in the electroless nickel solution for about 15 minutes before the optical fiber is immersed. The dummy load remains in the electroless nickel solution for the length of time necessary to deplete the stabilizers, and then is removed. As described hereinbefore, the desired deposition thickness is about 2–3 microns, and the desired plating rate is about 0.22 microns/minute. This dummy load of low carbon steel is sized to approximate a surface area of about 0.25 ft$^2$ per gallon.

Figure 5C:
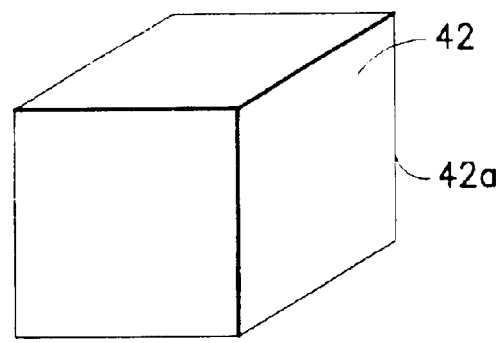
FIG. 5(C) shows a cubic dummy load for use in the method shown in FIGS. 1, 5(A) and 4.
Figure 5D:
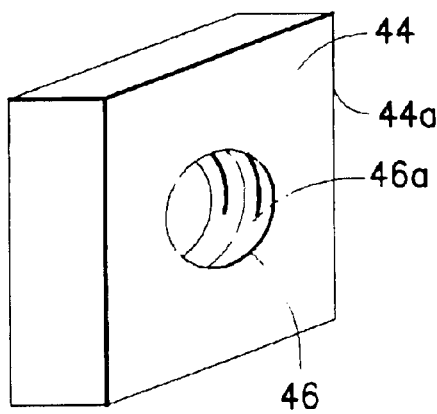
FIG. 5(D) shows a rectangular dummy load for use in the method shown in FIGS. 1, 5(A) and 4.

FIGS. 5(B), 5(C), 5(D) show dummy loads having different geometric shapes. FIG. 5(B) shows a cylindrical dummy load 40 having cylindrical edges 40a. FIG. 5(C) shows a cubical dummy load 42 having cubic edges 42a. FIG. 5(D) shows a rectangular dummy load 44 having rectangular edges 44a and having a threaded aperture 46 with threaded edges 46a. For the dummy loading technique, it has been found that a dummy load having a greater surface area (e.g., dummy load of FIG. 5(D)) provides better coating of the optical waveguide.

Table of Solutions

| Solution Supplier | Ph | Temp | Constituent parts |
|---|---|---|---|
| SnCl2 (tin chloride) Shipley (Shipley 471) | NA | Room Temp | SnCl2 |
| PdCl2 (palladium chloride) Shipley (Shipley 571) | NA | Room Temp | PdCl2, HCl |
| Electroless Nickel (4865 A) Fidelity (Fidelity 4865A) | with B, 4.85 | +/− .1 C. | Nickel sulfate |
| Electroless Nickel (4865 B) Fidelity (Fidelity 4865B) | with A, 4.85 | +/− .1 C. | Sodium Hypophosphite, sodium hydroxide, acetic acid |
| Electroless Gold Technic, Inc. (Oromerse N) | 5.72 | 70 C. +/− 1 C. | Gold in cyanide solution |
| Deionized Water NA | NA | Room Temp | 18 MOhm DI water |

The Large Diameter Waveguide Cane Structure

While the method described hereinbefore concerns the metallization of a glass element such as an optical fiber, having a diameter of about 125 microns, one skilled in the art will recognize and appreciate that the method may be used to coat other optical waveguides such as a large diameter optical waveguide 50, as discussed below. The scope of the invention is not intended to be limited to the diameter of the optical waveguide. For example, embodiments are envisioned wherein the steps of the method are performed on an optical waveguide having a diameter of 80 microns, 250 microns, 300 microns, etc.

Figure 6:
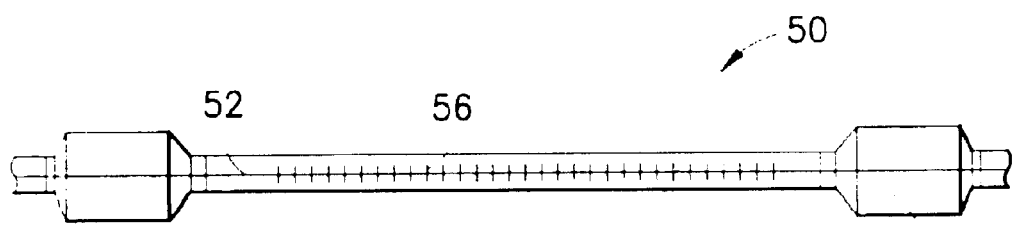
FIG. 6 shows a large diameter waveguide in accordance with the invention.

In FIG. 6, the large diameter optical waveguide 50 has at least one core 52 surrounded by a cladding 54, similar to that disclosed in co-pending U.S. patent application Ser. No. 09/455,868, entitled "Large Diameter Optical Waveguide, Grating, and Laser", and U.S. patent application Ser. No. 60/276,453, entitled "Method and Apparatus for Coupling Light in an optical Waveguide", which are incorporated herein by reference. The waveguide 50 comprises silica glass ($SiO_2$) based material having the appropriate dopants, as is known, to allow light to propagate in either direction along the core 52 and/or within the waveguide. The core 52 has an outer dimension and the waveguide 50 has an outer dimension. Other materials for the optical waveguide 50 may be used if desired. For example, the waveguide may be made of any glass, e.g., silica, silicon, phosphate glass, or other glasses.

The cladding 54 may have an outer dimension of at least about 0.3 mm and the core 52 may have an outer dimension such that it propagates only a few spatial modes (e.g., less than about 6). For example, for single spatial mode propagation, the core 52 has a substantially circular transverse cross-sectional shape with a diameter less than about 12.5 microns, depending on the wavelength of light. The outer diameter of the cladding 54 and the length L have values that will resist buckling when the waveguide 50 is placed in axial compression, as described in U.S. patent application Ser. No. 09/707,084, entitled "Compression Tuned Bragg Grating and Laser", which is incorporated herein by reference. The waveguide may have a Bragg grating 56 impressed (or embedded or imprinted) in the core or cladding of the waveguide.

The large diameter waveguide 50 may be made using fiber drawing techniques now known or later developed that provide the resultant desired dimensions for the core and the outer diameter discussed hereinbefore.

Alternatively, the large diameter waveguide may be formed by heating, collapsing and fusing a glass capillary tube to a fiber (not shown) by a laser, filament, flame, etc., as is described in co-pending U.S. patent application Ser. No. 09/455,865, entitled "Tube-Encased Fiber Grating", and U.S. patent application Ser. No. 09/455,867, entitled "Bragg Grating Pressure Sensor", which are incorporated herein by reference. Other techniques may be used for collapsing and fusing the tubes to the fiber, such as is discussed in U.S. Pat. No. 5,745,626, entitled "Method For And Encapsulation Of An Optical Fiber", to Duck et al., and/or U.S. Pat. No. 4,915,467, entitled "Method of Making Fiber Coupler Having Integral Precision Connection Wells", to Berkey, which are incorporated herein by reference to the extent necessary to understand the present invention, or other techniques. Alternatively, other techniques may be used to fuse the fiber to the tube, such as using a high temperature glass solder, e.g., a silica solder (powder or solid), such that the fiber, the tube and the solder all become fused to each other, or using laser welding/fusing or other fusing techniques.

Scope of the Invention

Although the invention has been described and illustrated with respect to exemplary embodiments thereof, the foregoing and various other additions and omissions may be made therein and thereto without departing from the spirit and scope of the present invention.

We claim:

1. A method of applying a metal coating to a glass element, comprising:
   partially depleting stabilizers of an electroless metallic solution by adding a dummy load in the form of a block of metal into the electroless metallic solution; and
   immersing the glass element in the electroless metallic solution to deposit the metal coating to the glass element.

2. The method according to claim 1, wherein the block of metal is made of low carbon steel.

3. The method according to claim 1, wherein the block of metal has a threaded cylindrical passage therein.

4. The method according to claim 1, wherein the block of metal has a surface area of about 0.25 square feet per gallon of the electroless metallic solution.

5. The method according to claim 1, wherein the step of partially depleting includes a step of providing the electroless metallic solution having a concentration of sodium hypophosphite ($NaH^2PO^2$) of about 25 grams/liter.

6. The method according to claim 1, wherein the glass element is an optical waveguide.

7. The method according to claim 1, wherein the electroless metallic solution comprises in a ratio of about 1:1:18 a first solution with a constituent part of nickel sulfate; a second solution with constituent parts of sodium hypophosphite, sodium hydroxide and acetic acid; and a de-ionized water.

8. The method according to claim 1, wherein the glass element is either an optical fiber having a diameter of about 125 microns, a large diameter optical waveguide having a diameter of at least 0.3 millimeters or an optical planar waveguide.

9. The method according to claim 1, wherein the electroless metallic solution comprises an electroless nickel solution.

10. The method according to claim 1, wherein the step of immersing the glass element includes immersing an optical waveguide in the electroless metallic solution for a predetermined length of time depending on a desired deposition thickness.

11. A method of applying a metal coating to a glass element, comprising:
   initializing the glass element by removing a polymer jacket, including cleaning the polymer jacket with acetone, wiping the polymer jacket using isopropanol, immersing the polymer jacket into sulfuric acid at a temperature of about 160–180 degrees Celsius to remove the polymer jacket and rinsing an area to be plated with de-ionized water;
   depleting partially stabilizers of an electroless metallic solution; and
   immersing the glass element in the electroless metallic solution to deposit the metal coating to the glass element.

* * * * *